United States Patent
Vijayakumar

(10) Patent No.: US 10,414,410 B2
(45) Date of Patent: Sep. 17, 2019

(54) PREDICTIVE ENGINE CALIBRATION BASED ON LOCATION AND ENVIRONMENTAL CONDITIONS TO IMPROVE FUEL ECONOMY

(71) Applicant: International Engine Intellectual Property Company, LLC, Lisle, IL (US)

(72) Inventor: Vishnu Vijayakumar, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 68 days.

(21) Appl. No.: 15/884,908

(22) Filed: Jan. 31, 2018

(65) Prior Publication Data

US 2019/0232971 A1    Aug. 1, 2019

(51) Int. Cl.
*B60W 50/04* (2006.01)
*H04W 4/40* (2018.01)
*B60W 50/00* (2006.01)

(52) U.S. Cl.
CPC ............ *B60W 50/045* (2013.01); *H04W 4/40* (2018.02); *B60W 2050/0026* (2013.01); *B60W 2050/0078* (2013.01); *B60W 2050/0088* (2013.01); *B60W 2050/046* (2013.01); *B60W 2510/0604* (2013.01); *B60W 2510/068* (2013.01); *B60W 2510/0638* (2013.01); *B60W 2510/0652* (2013.01); *B60W 2510/0666* (2013.01); *B60W 2510/0671* (2013.01); *B60W 2510/30* (2013.01); *B60W 2550/12* (2013.01); *B60W 2550/13* (2013.01); *B60W 2550/406* (2013.01)

(58) Field of Classification Search
CPC ............... B60W 50/04; B60W 50/045; B60W 2050/0026; B60W 2050/0078; B60W 2050/0088; B60W 2050/046; B60W 2510/0604; B60W 2510/0638; B60W 2510/0652; B60W 2510/0666; B60W 2510/0671; B60W 2510/068; B60W 2510/30; B60W 2550/12; B60W 2550/13; B60W 2550/406; H04W 4/40
See application file for complete search history.

(56) References Cited

U.S. PATENT DOCUMENTS 6,151,547 A * 11/2000 Kumar ................ G01M 15/102
 701/101
9,803,565 B1 * 10/2017 Ge ........................ F02D 19/087

FOREIGN PATENT DOCUMENTS

JP    20177172461 A  *  9/2017  ............. F02D 45/00

* cited by examiner

*Primary Examiner* — Hieu T Vo
(74) *Attorney, Agent, or Firm* — Jeffrey P. Calfa; Jack D. Nimz; Mark C. Bach

(57) ABSTRACT

A system and method for adjusting engine settings and/or calibrations is based on engine and/or vehicle parameters, and/or environmental conditions, and is further based upon a forecasted drive cycle, forecasted driving condition, vehicle vocation, vehicle geographic location, vehicle load, type of operation, season of the year, vehicle system or subsystem condition and/or operation, and/or other factors. An engine of the vehicle has an ECU configured to store and implement an engine control map. At least one algorithm is operable to determine an engine control map specific to an engine operating parameter, a vehicle operating parameter, an environmental condition, and/or an expected range of settings and calibrations. At least one device is configured to wirelessly upload to the vehicle the specific engine control map, and then load or flash the specific engine control map to the ECU.

20 Claims, 2 Drawing Sheets

PREDICTIVE ENGINE CALIBRATION BASED ON LOCATION AND ENVIRONMENTAL CONDITIONS TO IMPROVE FUEL ECONOMY

BACKGROUND

Embodiments described herein generally relate to a system and method for adjusting engine calibrations based on vehicle location, vehicle condition, and/or environmental conditions, and based upon forecasted drive cycles, in order to improve vehicle fuel economy and provide predictive performance improvements.

RELATED ART

A vehicle, such as a truck, a bus, and the like, is generally provided with a prime mover, such as a gas or diesel engine, connected to a powertrain that propels the vehicle. In order to control the engine, it is known to provide an Engine Control Unit (ECU). The ECU is an onboard computer that monitors operating parameters of the engine and/or vehicle, and/or environmental conditions, and controls various settings or calibrations according to these operating parameters and environmental conditions, and according to demand for engine power. Operating parameters of the engine and/or vehicle may include for example throttle position, engine load or power output, specific fuel consumption, engine coolant and oil temperature, intake air pressure and temperature, boost pressure, exhaust temperature and backpressure, spark timing (in the case of a gas engine), and/or engine speed and acceleration. Environmental conditions may include altitude, ambient pressure, and ambient temperature. Settings or calibrations may include quantity and timing of fuel injection, intake air boost pressure or throttling (in the case of a gas engine), and/or Engine Gas Recirculation (EGR) valve setting.

Currently, manufacturers of vehicles utilize a set of predefined multifactorial databases within the ECU, called "engine control maps," that correlate settings or calibrations of the engine to operating parameters of the engine and environmental conditions. An ECU of a given vehicle is typically loaded with a single engine control map, or a set of engine control maps, at the time of manufacture. This single engine control map or set of engine control maps may contain every combination or permutation of engine operating parameters, environmental conditions, settings, and/or calibration that the vehicle may ever expect to encounter. As a result, the single engine control map or set of engine control maps occupies a large amount of memory within the ECU. Furthermore, processing the engine operating parameters and/or environmental conditions to determine settings and/or calibrations of the engine may require a larger than necessary amount of processor capacity, as the ECU may process factors according to the single engine control map or set of engine control maps not relevant to the present environment, location, drive cycle, and/or vehicle, engine, and/or exhaust aftertreatment condition or operation.

ECU memory space and processing capacity is not only expensive, but may also be otherwise advantageously employed when not occupied or consumed by unneeded information or calculations. Accordingly, there is an unmet need for a system and method for minimizing the memory space and processing capacity occupied and/or consumed by engine control maps or sets of engine control maps, while maximizing other uses of ECU memory space and processing capacity.

SUMMARY

According to one embodiment of the system and method for adjusting engine settings and/or calibrations based on engine and/or vehicle parameters, and/or environmental conditions, and further based upon at least one of a forecasted drive cycle, forecasted driving condition, vehicle vocation, vehicle geographic location, vehicle load, type of operation, season of the year, vehicle system or subsystem condition and/or operation, and/or other factors, a vehicle has a system for adjusting an engine setting and/or an engine calibration. An engine of the vehicle has an ECU configured to store and implement an engine control map. At least one algorithm is operable to determine an engine control map specific to an engine operating parameter, a vehicle operating parameter, an environmental condition, and/or an expected range of settings and calibrations. At least one device is configured to wirelessly upload to the vehicle the specific engine control map, and then load or flash the specific engine control map to the ECU.

According to another embodiment of the system and method for adjusting engine settings and/or calibrations based on engine and/or vehicle parameters, and/or environmental conditions, and further based upon at least one of a forecasted drive cycle, forecasted driving condition, vehicle vocation, vehicle geographic location, vehicle load, type of operation, season of the year, vehicle system or subsystem condition and/or operation, and/or other factors, a system of a vehicle is provided for adjusting an engine setting and/or an engine calibration. An engine has an ECU configured to store and implement an engine control map. At least one algorithm is operable to determine an engine control map specific to an engine operating parameter, a vehicle operating parameter, an environmental condition, and/or an expected range of settings and calibrations. At least one device is configured to wirelessly upload to the vehicle the specific engine control map, and then load or flash the specific engine control map to the ECU.

According to another embodiment of the system and method for adjusting engine settings and/or calibrations based on engine and/or vehicle parameters, and/or environmental conditions, and further based upon at least one of a forecasted drive cycle, forecasted driving condition, vehicle vocation, vehicle geographic location, vehicle load, type of operation, season of the year, vehicle system or subsystem condition and/or operation, and/or other factors, a method for adjusting an engine setting and/or an engine calibration of an engine of a vehicle includes several steps. The first step is configuring an ECU to store and implement an engine control map. The second step is determining with at least one algorithm an engine control map specific to an engine operating parameter, a vehicle operating parameter, an environmental condition, and/or an expected range of settings and calibrations. The engine operating parameters, vehicle operating parameters, environmental conditions, and/or expected range of settings and calibrations, make up a subset of the total number of combinations or permutations of vehicle operating parameters, engine operating parameters, environmental conditions, and/or expected range of settings and calibrations that the vehicle may encounter. The third step is configuring at least one device to wirelessly upload to the vehicle the specific engine control map, and then to load or flash the specific engine control map to the ECU.

DETAILED DESCRIPTION

Figure 1:
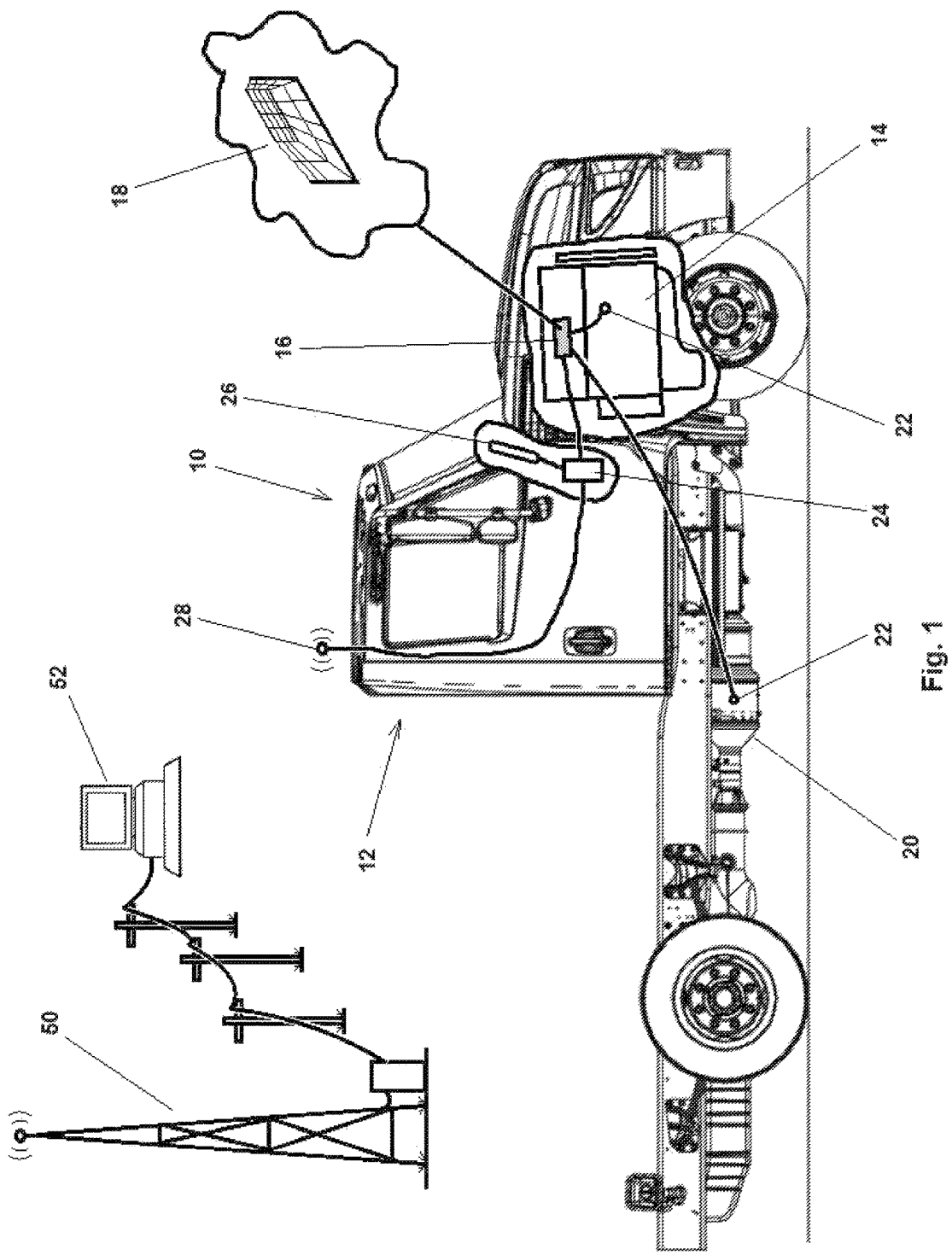
FIG. 1 is a side view of a vehicle having an embodiment of a system and method for adjusting engine settings and/or calibrations based on engine and/or vehicle parameters, and/or environmental conditions, and further based upon at least one of a forecasted drive cycle, forecasted driving condition, vehicle vocation, vehicle geographic location, vehicle load, type of operation, season of the year, vehicle system or subsystem condition and/or operation, and/or other factors, as described herein.

Embodiments described herein relate to a system and method for adjusting engine settings and/or calibrations based on engine and/or vehicle parameters, and/or environmental conditions, and further based upon forecasted drive cycles, forecasted driving conditions, vehicle vocation, vehicle geographic location, operating terrain (i.e.—hilly, mountainous, or flat), vehicle surroundings (i.e.—urban, suburban, or rural), vehicle load, vehicle type of operation, season of the year, vehicle system or subsystem, such as exhaust aftertreatment or Heating Ventilation and Air Conditioning (HVAC), condition and/or operation, vehicle or engine fluid condition, such as fuel quality or oil life remaining, and/or other factors. The system and method does this while minimizing the Engine Control Unit (ECU) memory space and processing capacity occupied and/or consumed by engine control maps or sets of engine control maps, and while maximizing other uses of ECU memory space and processing capacity, in order to improve vehicle fuel economy. The operating parameters of the engine and/or vehicle may therefore include, as non-limiting examples, throttle position, engine load or power output, specific fuel consumption, engine coolant and oil temperature, intake air pressure and temperature, boost pressure, exhaust temperature and backpressure, spark timing (in the case of a gas engine), engine speed and/or acceleration, exhaust aftertreatment or HVAC condition and/or operation, and/or fuel quality and/or oil life remaining. Operating parameters may be determined directly by way of sensors, or may be derived from other sensed or known values. Environmental conditions may include, as non-limiting examples, altitude, ambient pressure, ambient temperature, and/or humidity. Each of these environmental conditions may also be determined directly by way of sensors, or may be derived from other sensed or known values. Settings or calibrations may include, as non-limiting examples, quantity and timing of fuel injection, intake air boost pressure or throttling (in the case of a gas engine), and/or Engine Gas Recirculation (EGR) valve setting. The system and method may be applied to various types of vehicles, such as highway or semi-tractors, straight trucks, busses, fire trucks, agricultural vehicles, and etcetera. The several embodiments of the system and method presented herein are employed on commercial vehicles as examples, but this is not to be construed as limiting the scope of the system and method, which may be applied to passenger vehicles or vehicles of other uses.

More specifically, embodiments of the system and method may use one or more algorithms to determine an engine control map to be utilized by the ECU that accounts for only a subset of the total number of combinations or permutations of vehicle or engine operating parameters, environmental conditions, and range of settings and/or calibrations that the vehicle may ever expect to encounter. The one or more algorithms may accomplish this at least in part by forecasting at least one drive cycle, forecasting at least one driving condition, and/or taking into account vehicle vocation, vehicle geographic location, operating terrain, vehicle surroundings, vehicle load, vehicle type of operation, season of the year, vehicle system and/or subsystem condition and/or operation, vehicle or engine fluid condition, and/or other factors, and then loading and/or re-flashing the ECU with an engine control map specific to the at least one forecasted drive cycle, forecasted driving condition, and/or vehicle geographic location, operating terrain, vehicle surroundings, vehicle vocation, vehicle load, vehicle type of operation, season of the year, vehicle system or subsystem condition and/or operation, vehicle or engine fluid condition, and/or other factor. Engine control map information that is unnecessary to control the engine within the at least one forecasted drive cycle, forecasted driving condition, and/or vehicle geographic location, operating terrain, vehicle surroundings, vehicle vocation, vehicle load, vehicle type of operation, season of the year, vehicle system or subsystem condition and/or operation, vehicle or engine fluid condition, and/or other factors, are not included in the specific engine control map, and/or may be unloaded from the ECU's memory and/or excluded from the ECU's processing. Once the one or more algorithms determine the specific engine map to be utilized by the ECU, the specific engine control map may then be uploaded to the vehicle wirelessly, for non-limiting example by way of a telematics device or other wireless connection, by way of cellular and/or satellite communications, and/or by way of the internet, and then flashed to the ECU.

Embodiments of the system and method may forecast the at least one drive cycle using one or more self-learning routines or subroutines within the one or more algorithms. For non-limiting example, the one or more algorithms may determine that the vehicle is largely being used in a local delivery role characterized by predominantly start stop operation, rather than in a linehaul role characterized by continuous operation. As a result, the one or more algorithms may determine an engine control map to be utilized by the ECU specific to the local delivery role. Similarly, embodiments of the system and method may forecast the at least one driving condition using one or more self-learning routines or subroutines within the one or more algorithms. For non-limiting example, the one or more algorithms may determine that the vehicle is operating in hilly or mountainous terrain, rather than on largely flat terrain. As a result, the one or more algorithms may determine an engine control map to be utilized by the ECU specific to the hilly or mountainous terrain.

Embodiments of the system and method may take into account vehicle geographic location and/or altitude using information provided by way of Global Positioning System (GPS) or by way of cellular or other form of triangulation. Embodiments of the system and method may take into account vehicle load or vehicle type of operation, vehicle system or subsystem condition and/or operation, vehicle or engine fluid condition, and/or other factors, using information derived from data received from the vehicle data bus, Local Area Network (LAN), sensors, or other vehicle subsystem. Further embodiments of the system and method may use information provided by the telematics device itself to determine for non-limiting example the vehicle geographic location, operating terrain, vehicle surroundings, vehicle vocation, vehicle load, vehicle type of operation, and/or season of the year. Further embodiments of the system may derive certain factors such as vehicle geographic location and/or season of the year using the environmental conditions determined directly by way of sensors, or derived from other sensed or known values.

For example, the one or more algorithms may determine from ambient temperature, pressure, and humidity that the vehicle is more likely located in Colorado in the winter, than in Louisiana in the summer. As a result, the one or more algorithms may determine an engine control map to be utilized by the ECU specific to an environment such as Colorado in the winter, and may unload any engine control map information that would be likely only needed by the ECU in an environment such as Louisiana in the summer. In another example, if an embodiment of the one or more algorithms of the system and method determines by way of GPS that the vehicle is in fact located in Denver, determines by way of information provided by sensors that the vehicle is fully loaded, and determines by way of the telematics device that the vehicle is operating in a linehaul vocation and that it is winter, the one or more algorithms may determine an engine control map specific to these conditions. Any engine control map information necessary only when operating at sea level under lightly loaded conditions and/or when operating in a local delivery vocation in the summer may be unloaded from the ECU, as it is unlikely that the vehicle will travel far enough to substantially change these operating conditions.

Embodiments of the system and method may further take into account vehicle system or subsystem conditions or operation, such as exhaust aftertreatment condition and/or operation, or such as HVAC operation, as non-limiting examples, and/or vehicle or engine fluid condition, such as fuel quality or oil life remaining, as non-limiting examples, using information received from the vehicle data bus, vehicle LAN, sensors, GPS, or directly from the telematics device and/or ECU itself. Embodiments of the system and method may further use one or more self-learning routines or subroutines within the one or more algorithms to forecast the operation or condition of one or more vehicle system or subsystem, such as the exhaust aftertreatment system, or such as the HVAC system, as non-limiting examples, and/or to forecast a vehicle or engine fluid condition, such as fuel quality, or such as engine oil life remaining, as non-limiting examples. As a non-limiting example, if the exhaust aftertreatment has recently completed a regeneration, and will not need a regeneration for the next 60 to 100 miles, based at least partially upon driving habits of the operator as determined by the one or more self-learning routines or subroutines within the one or more algorithms, then the one or more algorithms may determine an engine control map that does not include information that would be likely only needed in the event of a regeneration. Any information that would be likely only needed in the event of a regeneration may then be unloaded from the ECU. In another non-limiting example, if the vehicle is located in Minnesota in the winter, the one or more algorithms may determine an engine control map that does not include information that would likely only be needed in hot weather with the air conditioning in operation. Any information only needed under these conditions may then be unloaded from the ECU.

Alternate embodiments of the system and method may allow a driver or operator to input at least one anticipated drive cycle, anticipated driving condition, and/or vehicle vocation, vehicle geographic location, operating terrain, vehicle surroundings, vehicle load, vehicle type of operation, season of the year, vehicle system or subsystem condition and/or operation, and/or vehicle or engine fluid condition, and may then load and/or re-flash the ECU with an engine control map specific to the at least one anticipated drive cycle, anticipated driving condition, and/or vehicle geographic location, operating terrain, vehicle surroundings, vehicle vocation, vehicle load, vehicle type of operation, season of the year, vehicle system or subsystem condition and/or operation, and/or vehicle or engine fluid condition. Again, factors that are unnecessary to control the engine within the inputted drive cycle, driving condition, and/or vehicle geographic location, operating terrain, vehicle surroundings, vehicle vocation, vehicle load, vehicle type of operation, season of the year, vehicle system or subsystem condition and/or operation, and/or vehicle or engine fluid condition, are not included in the specific engine control map, and/or may be unloaded from the ECU's memory and/or excluded from the ECU's processing. As before, the specific engine control map may be uploaded to the vehicle wirelessly, for non-limiting example by way of a telematics device or other wireless connection, by way of cellular and/or satellite communications, and/or by way of the internet.

The one or more algorithms may reside on or be integrated with the ECU, the telematics device, or a remote server, or may partially reside on or be integrated with more than one of the ECU, the telematics device, and the remote server. In a non-limiting example, part of the one or more algorithms may reside on or be integrated with the vehicle ECU and may forecast at least one drive cycle using a self-learning routine or subroutine, forecast at least one driving condition using another self-learning routine or subroutine, determine at least one vehicle system and/or subsystem condition and/or operation, determine at least one vehicle or engine fluid condition, and determine at least one ambient condition using one or more sensors. Another part of the one or more algorithms may reside on or be integrated with the telematics device and may determine the vehicle geographic location, altitude, operating terrain, and/or vehicle surroundings by way of GPS capability, and determine vehicle load from information received from the vehicle data bus. Yet another part of the one or more algorithms may reside on a remote server and may determine the vehicle vocation, the vehicle type of operation, and the season of year. Another part of the one or more algorithms may reside on the remote server, and may determine and communicate the specific engine control map needed for each of these factors. Another part of the one or more algorithms residing on or integrated with the telematics device may then be responsible for re-flashing the ECU at the correct time.

The one or more algorithms may default to a specific engine control map inclusive of all possible values of a given factor if information about that factor is for some reason unavailable. For non-limiting example, if operating terrain information is unavailable for a certain geographic location that the vehicle is likely to traverse, the one or more algorithms may choose a specific engine control map that includes all settings and/or calibrations for any given operating terrain. Further, the one or more algorithms may apply fuzzy logic in order to deal with missing or conflicting factors. The one or more algorithms may run at preset intervals, opportunistically, or continuously, or may selectively run at preset intervals, opportunistically, and continuously, depending on one or more of the factors, and/or upon selection by an operator. The one or more algorithms may further re-flash the ECU at preset intervals, opportunistically, or continuously, according to the capabilities of the ECU. The one or more algorithms may further selectively re-flash the ECU at preset intervals, opportunistically, and continuously, depending on one or more of the factors, and/or upon selection by an operator.

The system and method may then use the ECU memory and/or processing capacity made available through the use of the specific engine control map to run further optimizing routines utilizing the subset of combinations or permutations of engine operating parameters, environmental conditions, and range of settings and/or calibrations within that specific engine control map, and/or utilizing sensed engine operating parameters and/or sensed environmental conditions. In this way, the ECU memory and/or processing capacity made available through the use of the specific engine control map may be used to maximize the fuel economy of the engine or to accomplish other desirable ends, such as optimizing vehicle performance and/or reducing exhaust emissions, as non-limiting examples. Additionally, the system and method may then use the ECU memory and/or processing capacity made available through the use of the specific engine control map, combined with the at least one forecasted drive cycle and/or the at least one forecasted driving condition, to run further predictive performance improvement routines, wherein empirical or learned information may be used to further maximize the fuel economy of the engine or to accomplish other desirable ends, such as the non-limiting examples given above.

Referring now to FIG. 1, a side view is shown of a vehicle 10 having an embodiment of a system and method 12 for adjusting engine settings and/or calibrations based on engine and/or vehicle parameters, and/or environmental conditions, and further based upon forecasted drive cycles, forecasted driving conditions, vehicle vocation, vehicle geographic location, vehicle load, type of operation, season of the year, vehicle system or subsystem condition and/or operation, and/or other factors. The vehicle 10 includes an engine 14 connected to at least one vehicle and/or engine system or subsystem, such as an exhaust aftertreatment system 20, as a non-limiting example. The engine 14 has an ECU 16 having an engine control map 18. The engine control map 18 contains a predefined multifactorial database, such as a lookup table or similar set of data, which correlates settings or calibrations of the engine 18 to operating parameters of the vehicle and/or engine and/or to environmental conditions.

The system and method 12 may again use one or more algorithms to determine an engine control map 18 to be utilized by the ECU 16 that accounts for only a subset of the total number of combinations or permutations of vehicle or engine operating parameters, environmental conditions, and range of settings and/or calibrations that the vehicle may ever expect to encounter, as described above. The system and method 12 may utilize information provided by at least one sensor 22, and/or provided by at least one GPS and/or input device 26 in determining the engine control map 18 to be utilized by the ECU 16. Once the system and method 12 determines an engine control map 18 to be utilized by the ECU 16 specific to an least one forecasted drive cycle, forecasted driving condition, and/or vehicle geographic location, operating terrain, vehicle surroundings, vehicle vocation, vehicle load, vehicle type of operation, season of the year, vehicle system or subsystem condition and/or operation, vehicle or engine fluid condition, and/or other factor, as described above, the system and method 12 may download the specific engine control map 18 by way of a telematics device 24 having a wireless connection 28. The specific engine control map 18 may be downloaded from a remote server 52 across a cellular network 50 connected to the internet.

Figure 2:
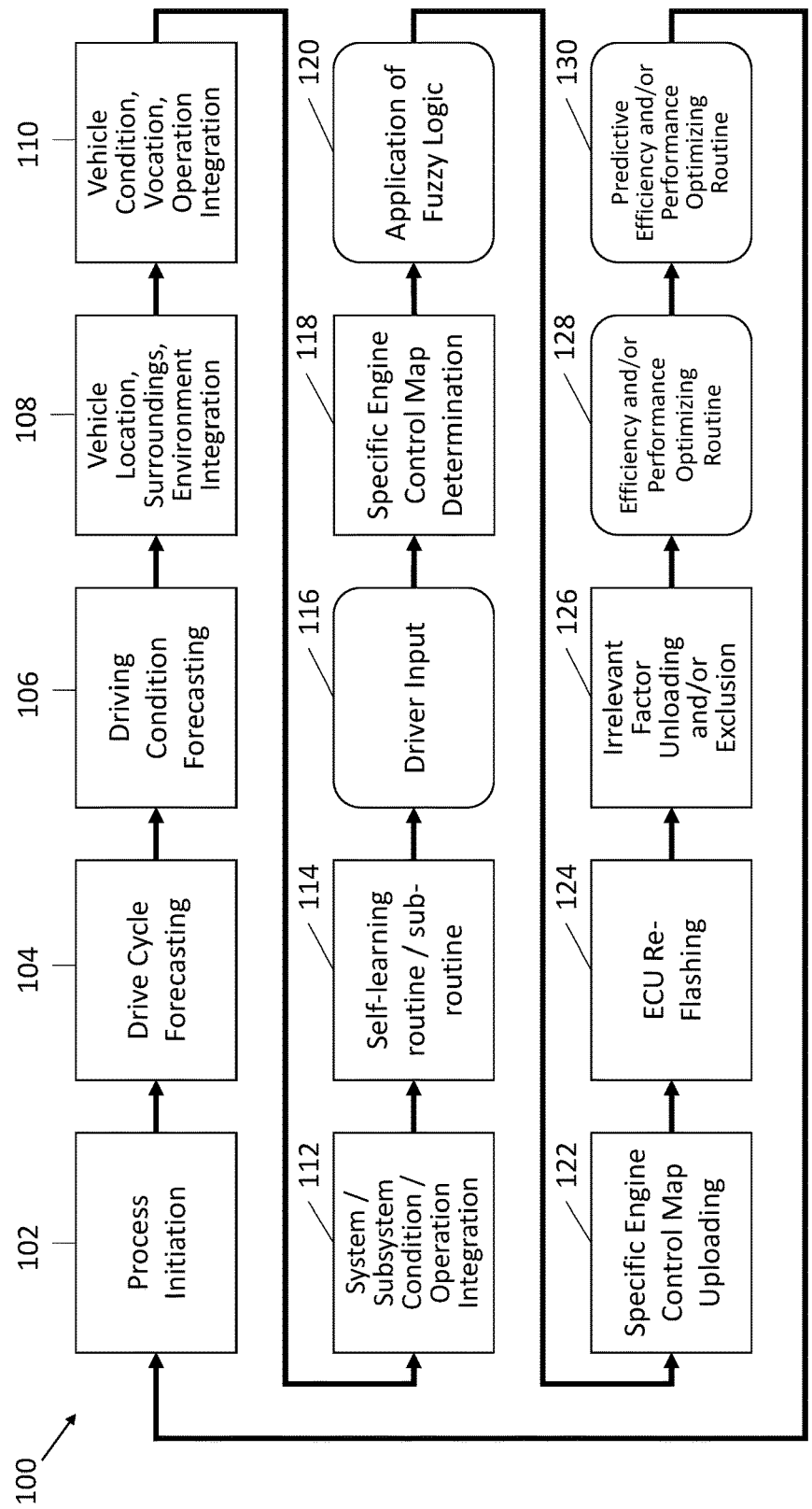
FIG. 2 is a graphical representation of an embodiment of a method for adjusting engine settings and/or calibrations based on engine and/or vehicle parameters, and/or environmental conditions, and further based upon at least one of a forecasted drive cycle, forecasted driving condition, vehicle vocation, vehicle geographic location, vehicle load, type of operation, season of the year, vehicle system or subsystem condition and/or operation, and/or other factors, as described herein.

Turning now to FIG. 2, a graphical representation is shown of an embodiment of a system and method 12 for adjusting engine settings and/or calibrations based on engine and/or vehicle parameters, and/or environmental conditions, and further based upon forecasted drive cycles, forecasted driving conditions, vehicle vocation, vehicle geographic location, vehicle load, type of operation, season of the year, vehicle system or subsystem condition and/or operation, and/or other factors. The process 100 starts at a process initiation step 102 wherein one or more algorithms run at preset intervals, opportunistically, or continuously, or selectively at preset intervals, opportunistically, or continuously depending upon one or more factors and/or upon selection by an operator. The process 100 may then undertake at least one drive cycle forecasting step 104 wherein one or more self-learning routines or subroutines within the one or more algorithms characterize, for non-limiting example, an upcoming role or use of the vehicle. Following the at least one drive cycle forecasting step 104, the process 100 may then undertake at least one driving condition forecasting step 106, wherein one or more self-learning routines or subroutines within the one or more algorithms characterize an upcoming driving condition in which the vehicle will operate.

The process 100 may then undertake at least one vehicle location, vehicle surroundings, and/or environment integration step 108, wherein for non-limiting example vehicle geographic location and/or altitude information is provided to the one or more algorithms by way of GPS or by way of cellular or other form of triangulation. Further information may be derived by the one or more algorithms from data received from the vehicle data bus, vehicle LAN, sensors, or other vehicle subsystems. Additional information regarding vehicle geographic location, operating terrain, vehicle surroundings, and/or season of the year may be provided to the one or more algorithms by the telematics device itself, or may be determined directly by way of sensors, or derived from other sensed or known values. The process 100 may then undertake at least one vehicle condition, vehicle vocation, and/or vehicle operation integration step 110, wherein vehicle load or type of operation, vehicle or engine fluid condition, and/or other factors are derived by the one or more algorithms from data received from the vehicle data bus, vehicle LAN, sensors, or other vehicle subsystems. Additional information regarding vehicle vocation, vehicle load, and/or vehicle type of operation may be provided to the one or more algorithms by the telematics device itself. The process 100 may then undertake at least one vehicle system or subsystem condition and/or operation integration step 112, wherein vehicle system or subsystem, such as exhaust aftertreatment or HVAC as non-limiting examples, condition and/or operation information, and/or vehicle or engine fluid condition, is derived by the one or more algorithms from data received from the vehicle data bus, vehicle LAN, sensors, GPS or other vehicle subsystems. Additional information regarding vehicle system or subsystem condition and/or operation, and/or vehicle or engine fluid condition, may be provided to the one or more algorithms by the telematics device and/or ECU itself The process 100 may then undertake at least one self-learning routine or subroutine 114 wherein the one or more algorithms forecast the operation or condition of one or more vehicle system or subsystem, such as the exhaust aftertreatment system, or such as the HVAC system, as non-limiting examples, and/or forecast a vehicle or engine fluid condition, such as fuel quality, or such as engine life remaining, as non-limiting examples. The process 100 may then undertake an optional driver input step 116 wherein a driver or operator may input at least one anticipated drive cycle, anticipated driving condition, and/or vehicle vocation, vehicle geographic location, operating terrain, vehicle surroundings, vehicle load, vehicle type of operation, season of the year, vehicle system or subsystem condition and/or operation, and/or vehicle or engine fluid condition.

The process 100 then undertakes a specific engine control map determination step 118, wherein the one or more algorithms of the process 100 determine a specific engine control map to be utilized by the ECU that accounts for only a subset of the total number of combinations or permutations of vehicle or engine operating parameters, environmental conditions, and range of settings and/or calibrations that the vehicle may ever expect to encounter. The one or more algorithms of process 100 determine the specific engine control map at step 118 based on at least one of a forecasted or entered anticipated drive cycle, a forecasted or entered anticipated driving condition, vehicle vocation, vehicle geographic location, operating terrain, operating altitude, vehicle surroundings, vehicle load, vehicle type of operation, season of the year, vehicle system and/or subsystem condition and/or operation, vehicle or engine fluid condition, and/or other factor. If information about a given factor is for some reason unavailable, the one or more algorithms may default to a specific engine control map otherwise based on at least one of a forecasted or entered anticipated drive cycle, a forecasted or entered anticipated driving condition, vehicle vocation, vehicle geographic location, operating terrain, operating altitude, vehicle surroundings, vehicle load, vehicle type of operation, season of the year, vehicle system and/or subsystem condition and/or operation, vehicle or engine fluid condition, and/or other factor, but inclusive of all possible values of the factor missing about which information is missing. Further, the one or more algorithms of the process 100 may optionally apply fuzzy logic at step 120 in order to deal with missing or conflicting factors.

The process 100 then undertakes a specific engine control map uploading step 122, wherein the specific engine control map is uploaded to the vehicle wirelessly, for non-limiting example by way of the telematics device or other wireless connection, by way of cellular and/or satellite communications, and/or by way of the internet. The process 100 then undertakes an ECU re-flashing step 124, wherein the specific engine control map is re-flashed to the ECU. The one or more algorithms of the process 100 may re-flash the ECU at preset intervals, opportunistically, or continuously, according to the capabilities of the ECU, depending on one or more of the factors, and/or upon selection by an operator. The process 100 may then undertake an irrelevant factor unloading and/or exclusion step 126, wherein engine control map information that is unnecessary to control the engine within the at least one forecasted or entered anticipated drive cycle, forecasted or entered anticipated driving condition, vehicle geographic location, operating terrain, vehicle surroundings, vehicle vocation, vehicle load, vehicle type of operation, season of the year, vehicle system or subsystem condition and/or operation, vehicle or engine fluid condition, and/or other factors, are unloaded from the ECU's memory and/or excluded from the ECU's processing.

The process 100 may then undertake an optional efficiency and/or performance optimizing routine 128, wherein using ECU memory and/or processing capacity made available through the use of the specific engine control map, one or more optimizing routines within the one or more algorithms analyze the subset of combinations or permutations of engine operating parameters, environmental conditions, and range of settings and/or calibrations within that specific engine control map, and/or utilize sensed engine operating parameters and/or sensed environmental conditions to maximize the fuel economy of the engine or to accomplish other desirable ends, such as optimizing vehicle performance and/or reducing exhaust emissions, as a non-limiting examples. The process 100 may then undertake an optional predictive efficiency and/or performance optimizing routine 130, wherein the one or more optimizing routines within the one or more algorithms run further predictive performance improvement routines, using empirical or learned information to further maximize the fuel economy of the engine or to accomplish other desirable ends. The process then returns to the process initiation step 102.

While the system and method for adjusting engine settings and/or calibrations based on engine and/or vehicle parameters, and/or environmental conditions, and further based upon forecasted drive cycles, forecasted driving conditions, vehicle vocation, vehicle geographic location, vehicle load, type of operation, season of the year, vehicle system or subsystem condition and/or operation, and/or other factors, has been described with respect to at least one embodiment, the system and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

| REFERENCE NUMBER LISTING | |
|---|---|
| 10 | Vehicle |
| 12 | System for adjusting engine settings and/or calibrations |
| 14 | Engine |
| 16 | Engine Control Unit (ECU) |
| 18 | Engine control map |
| 20 | Exhaust aftertreatment system |
| 22 | Sensor |
| 24 | Telematics device |
| 26 | GPS/input device |
| 28 | Wireless connection |
| 50 | Cellular network |
| 52 | Remote server |
| 100 | Process |
| 102 | Process initiation step |
| 104 | Drive cycle forecasting step |
| 106 | Driving condition forecasting step |
| 108 | Vehicle location, surroundings, and/or environment integrating step |
| 110 | Vehicle condition, vocation, operation integrating step |
| 112 | Vehicle system or subsystem condition and/or operation integrating step |
| 114 | Self-learning routine or subroutine |
| 116 | Optional driver input step |
| 118 | Specific engine control map determination step |
| 120 | Optional application of fuzzy logic |

REFERENCE NUMBER LISTING

| | |
|---|---|
| 122 | Specific engine control map uploading step |
| 124 | ECU re-flashing step |
| 126 | Irrelevant factor unloading and/or exclusion step |
| 128 | Optional efficiency and/or performance optimizing routines |
| 130 | Optional predictive efficiency and/or performance optimizing routines |

What is claimed is:

1. A vehicle having a system for adjusting at least one of an engine setting and an engine calibration, comprising:
   an engine having an Engine Control Unit (ECU) configured to store and implement an engine control map;
   at least one algorithm operable to determine an engine control map specific to at least one of an engine operating parameter, a vehicle operating parameter, an environmental condition, and an expected range of settings and calibrations; and
   at least one device configured to wirelessly upload to the vehicle the specific engine control map and load or flash the specific engine control map to the ECU.

2. The vehicle of claim 1, wherein:
   the at least one engine operating parameter, vehicle operating parameter, environmental condition, and expected range of settings and calibrations, further comprises a subset of a total number of combinations or permutations of vehicle operating parameters, engine operating parameters, environmental conditions, and expected range of settings and calibrations that the vehicle may encounter.

3. The vehicle of claim 1, wherein:
   the at least one algorithm being further operable to determine an engine control map specific to the least one of an engine operating parameter, a vehicle operating parameter, an environmental condition, and an expected range of settings and calibrations, using at least one of:
      a forecasted or inputted drive cycle;
      a forecasted or inputted driving condition;
      a vehicle geographic location;
      an operating terrain;
      a vehicle surrounding;
      a vehicle vocation;
      a vehicle load;
      a vehicle type of operation;
      a season of the year;
      a vehicle system or subsystem condition or operation; and
      a vehicle or engine fluid condition.

4. The vehicle of claim 3, wherein:
   the at least one algorithm residing at least partially on at least one of the ECU, the at least one device, and a remote server;
   the at least one device and the remote server being wirelessly connected by way of at least one of cellular communications, satellite communications, and the internet;
   the at least one algorithm being further operable to at least one of:
      forecast at least one drive cycle using a self-learning routine or subroutine;
      receive anticipated drive cycle information from an operator;
      forecast at least one driving condition using a self-learning routine or subroutine;
      receive anticipated driving condition information from an operator;
      determine at least one of a vehicle system or subsystem condition or operation, a vehicle or engine fluid condition, and an ambient condition using information received from at least one of the at least one device, the ECU, a vehicle data bus, a Local Area Network (LAN), at least one sensor, and operator input;
      forecast at least one of a vehicle system or subsystem condition or operation, and a vehicle or engine fluid condition, using a self-learning routine or subroutine;
      determine at least one of vehicle geographic location, altitude, terrain, and surroundings by way of at least one of the at least one device, GPS, cellular triangulation, and operator input;
      determine vehicle load from information received from at least one of a vehicle data bus, a LAN, at least one sensor, and operator input; and
      determine vehicle vocation, vehicle type of operation, and the season of year using information received from at least one of the at least one device, a remote server, and operator input.

5. The vehicle of claim 3, wherein:
   the at least one algorithm being further operable to at least one of exclude from ECU processing and unload from ECU memory engine control map information that is unnecessary to control the engine within the at least one forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition.

6. The vehicle of claim 5, wherein:
   the at least one algorithm being further operable to at least one of:
      default to a specific engine control map inclusive of all possible values of an engine operating parameter, vehicle operating parameter, environmental condition, forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition, if information about that engine operating parameter, vehicle operating parameter, environmental condition forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition is unavailable; and
      apply fuzzy logic in order to deal with a missing or conflicting engine operating parameter, vehicle operating parameter, environmental condition, forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition.

7. The vehicle of claim 3, wherein:
the at least one algorithm further including at least one optimizing routine that utilizes the subset of combinations or permutations of engine operating parameters, vehicle operating parameters, environmental conditions, expected range of settings and calibrations within the specific engine control map, and the at least one forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition to at least one of maximize fuel economy of the engine, optimize vehicle performance, and reduce exhaust emissions.

8. The vehicle of claim 1, wherein:
the at least one engine operating parameter and the at least one vehicle operating parameter further comprises at least one of a throttle position, an engine load or power output, a specific fuel consumption, an engine coolant temperature, an oil temperature, an intake air pressure, an intake air temperature, a boost pressure, an exhaust temperature, an exhaust backpressure, a spark timing, an engine speed, an engine acceleration, an exhaust aftertreatment condition or operation, a Heating Ventilation and Air Conditioning (HVAC) condition or operation, a fuel quality, and an oil life remaining;
the at least one environmental condition further comprises at least one of an altitude, an ambient pressure, an ambient temperature, and an ambient humidity; and
the at least one of an engine setting and an engine calibration further comprises at least one of a quantity and timing of fuel injection, an intake air boost pressure or throttling, and an Engine Gas Recirculation (EGR) valve setting.

9. A system of a vehicle for adjusting at least one of an engine setting and an engine calibration, comprising:
an engine having an ECU configured to store and implement an engine control map;
at least one algorithm operable to determine an engine control map specific to at least one of an engine operating parameter, a vehicle operating parameter, an environmental condition, and an expected range of settings and calibrations; and
at least one device configured to wirelessly upload to the vehicle the specific engine control map and load or flash the specific engine control map to the ECU.

10. The system of claim 9, wherein:
the at least one engine operating parameter, vehicle operating parameter, environmental condition, and expected range of settings and calibrations, further comprises a subset of a total number of combinations or permutations of vehicle operating parameters, engine operating parameters, environmental conditions, and expected range of settings and calibrations that the vehicle may encounter.

11. The system of claim 9, wherein:
the at least one algorithm being further operable to determine an engine control map specific to the least one of an engine operating parameter, a vehicle operating parameter, an environmental condition, and an expected range of settings and calibrations, using at least one of:
a forecasted or inputted drive cycle;
a forecasted or inputted driving condition;
a vehicle geographic location;
an operating terrain;
a vehicle surrounding;
a vehicle vocation;
a vehicle load;
a vehicle type of operation;
a season of the year;
a vehicle system or subsystem condition or operation; and
a vehicle or engine fluid condition.

12. The system of claim 11, wherein:
the at least one algorithm residing at least partially on at least one of the ECU, the at least one device, and a remote server;
the at least one device and the remote server being wirelessly connected by way of at least one of cellular communications, satellite communications, and the internet;
the at least one algorithm being further operable to at least one of:
forecast at least one drive cycle using a self-learning routine or subroutine;
receive anticipated drive cycle information from an operator;
forecast at least one driving condition using a self-learning routine or subroutine;
receive anticipated driving condition information from an operator;
determine at least one of a vehicle system or subsystem condition or operation, a vehicle or engine fluid condition, and an ambient condition using information received from at least one of the at least one device, the ECU, a vehicle data bus, a LAN, at least one sensor, and operator input;
forecast at least one of a vehicle system or subsystem condition or operation, and a vehicle or engine fluid condition, using a self-learning routine or subroutine;
determine at least one of vehicle geographic location, altitude, terrain, and surroundings by way of at least one of the at least one device, GPS, cellular triangulation, and operator input;
determine vehicle load from information received from at least one of a vehicle data bus, a LAN, at least one sensor, and operator input; and
determine vehicle vocation, vehicle type of operation, and the season of year using information received from at least one of the at least one device, a remote server, and operator input.

13. The system of claim 11, wherein:
the at least one algorithm being further operable to at least one of exclude from ECU processing and unload from ECU memory engine control map information that is unnecessary to control the engine within the at least one forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition.

14. The system of claim 13, wherein:
the at least one algorithm being further operable to at least one of:
default to a specific engine control map inclusive of all possible values of an engine operating parameter, vehicle operating parameter, environmental condition, forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition, if information about that engine operating parameter, vehicle operating parameter, environmental condition forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition is unavailable; and apply fuzzy logic in order to deal with a missing or conflicting engine operating parameter, vehicle operating parameter, environmental condition, forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition.

15. The system of claim 11, wherein:
the at least one algorithm further including at least one optimizing routine that utilizes the subset of combinations or permutations of engine operating parameters, vehicle operating parameters, environmental conditions, expected range of settings and calibrations within the specific engine control map, and the at least one forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition to at least one of maximize fuel economy of the engine, optimize vehicle performance, and reduce exhaust emissions.

16. The system of claim 9, wherein:
the at least one engine operating parameter and the at least one vehicle operating parameter further comprises at least one of a throttle position, an engine load or power output, a specific fuel consumption, an engine coolant temperature, an oil temperature, an intake air pressure, an intake air temperature, a boost pressure, an exhaust temperature, an exhaust backpressure, a spark timing, an engine speed, an engine acceleration, an exhaust aftertreatment condition or operation, an HVAC condition or operation, a fuel quality, and an oil life remaining;
the at least one environmental condition further comprises at least one of an altitude, an ambient pressure, an ambient temperature, and an ambient humidity; and
the at least one of an engine setting and an engine calibration further comprises at least one of a quantity and timing of fuel injection, an intake air boost pressure or throttling, and an EGR valve setting.

17. A method for adjusting at least one of an engine setting and an engine calibration of an engine of a vehicle, comprising the steps of:
configuring an ECU to store and implement an engine control map;
determining with at least one algorithm an engine control map specific to at least one of an engine operating parameter, a vehicle operating parameter, an environmental condition, and an expected range of settings and calibrations;
the at least one engine operating parameter, vehicle operating parameter, environmental condition, and expected range of settings and calibrations, further comprising a subset of a total number of combinations or permutations of vehicle operating parameters, engine operating parameters, environmental conditions, and expected range of settings and calibrations that the vehicle may encounter; and
configuring at least one device to wirelessly upload to the vehicle the specific engine control map and to load or flash the specific engine control map to the ECU.

18. The method of claim 17, further comprising the step of:
determining with the at least one algorithm an engine control map specific to the least one of an engine operating parameter, a vehicle operating parameter, an environmental condition, and an expected range of settings and calibrations, using at least one of:
a forecasted or inputted drive cycle;
a forecasted or inputted driving condition;
a vehicle geographic location;
an operating terrain;
a vehicle surrounding;
a vehicle vocation;
a vehicle load;
a vehicle type of operation;
a season of the year;
a vehicle system or subsystem condition or operation; and
a vehicle or engine fluid condition.

19. The method of claim 18, further comprising the steps of:
installing the at least one algorithm at least partially on at least one of the ECU, on the at least one device, and on a remote server;
wirelessly connecting the at least one device to the remote server by way of at least one of cellular communications, satellite communications, and the internet;
with the at least one algorithm at least one of:
forecasting at least one drive cycle using a self-learning routine or subroutine;
receiving anticipated drive cycle information from an operator;
forecasting at least one driving condition using a self-learning routine or subroutine;
receiving anticipated driving condition information from an operator;
determining at least one of a vehicle system or subsystem condition or operation, a vehicle or engine fluid condition, and an ambient condition using information received from at least one of the at least one device, the ECU, a vehicle data bus, a LAN, at least one sensor, and operator input;
forecasting at least one of a vehicle system or subsystem condition or operation, and a vehicle or engine fluid condition, using a self-learning routine or subroutine;
determining at least one of vehicle geographic location, altitude, terrain, and surroundings by way of at least one of the at least one device, GPS, cellular triangulation, and operator input;
determining vehicle load from information received from at least one of a vehicle data bus, a LAN, at least one sensor, and operator input; and
determining vehicle vocation, vehicle type of operation, and the season of year using information received from at least one of the at least one device, a remote server, and operator input.

20. The method of claim 18, further comprising the steps of:

including in the at least one algorithm at least one optimizing routine that utilizes the subset of combinations or permutations of engine operating parameters, vehicle operating parameters, environmental conditions, expected range of settings and calibrations within the specific engine control map, and the at least one forecasted or inputted drive cycle, forecasted or inputted driving condition, vehicle geographic location, operating terrain, vehicle surrounding, vehicle vocation, vehicle load, vehicle type of operation, season of the year, vehicle system or subsystem condition or operation, or vehicle or engine fluid condition to at least one of maximize fuel economy of the engine, optimize vehicle performance, and reduce exhaust emissions.

\* \* \* \* \*